J. L., M. L. & J. O. BOYER.
JOURNAL BEARING.
APPLICATION FILED APR. 19, 1909.
955,248.
Patented Apr. 19, 1910.
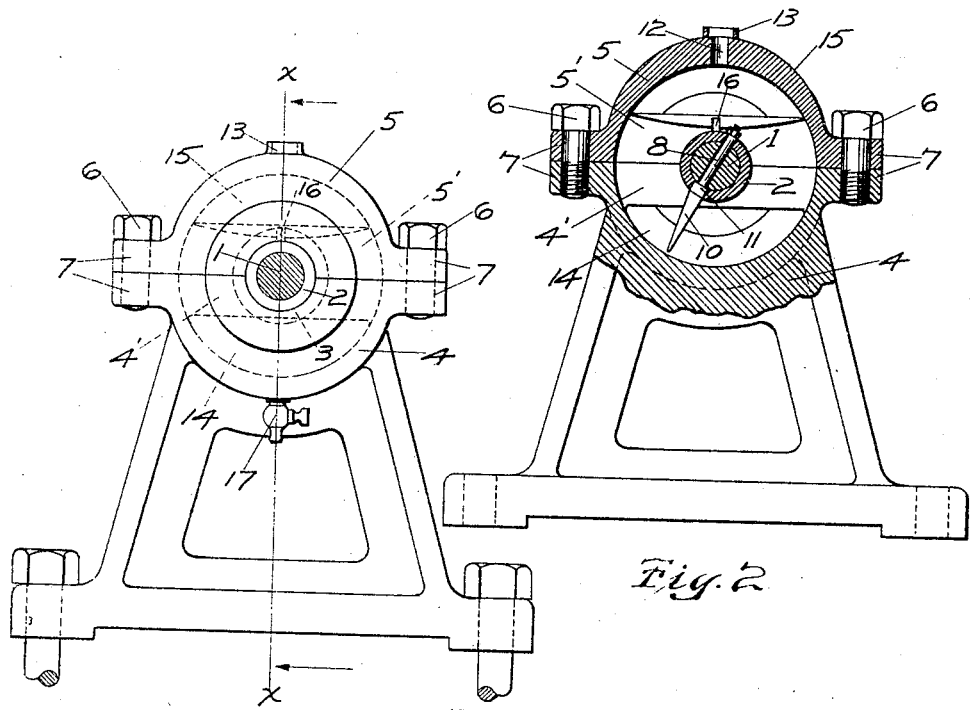
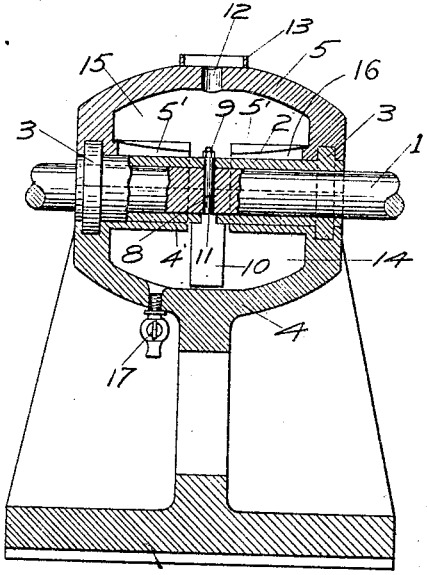
Witnesses:
Inventors:
Jonathan L. Boyer.
Malain L. Boyer.
Jacob O. Boyer.
by Joshua R. H. Potts
their Attorney

UNITED STATES PATENT OFFICE.

JONATHAN L. BOYER, OF HAMILTON, MALAIN L. BOYER, OF COLUSA, AND JACOB O. BOYER, OF PONTOOSUC, ILLINOIS.

JOURNAL-BEARING.

955,248.  Specification of Letters Patent.  Patented Apr. 19, 1910.

Application filed April 19, 1909. Serial No. 490,672.

*To all whom it may concern:*

Be it known that we, JONATHAN L. BOYER, MALAIN L. BOYER, and JACOB O. BOYER, citizens of the United States, and residents of Hamilton, Colusa, and Pontoosuc, respectively, county of Hancock, and State of Illinois, have invented certain new and useful Improvements in Journal-Bearings, of which the following is a specification.

Our invention relates to journal bearings or boxes and the object of our invention is to provide a bearing of such character in which will be embodied means adapted to effect the automatic lubrication of the shaft journal or other rotary means mounted therein.

A further object is to provide a journal bearing which will be efficient, strong, durable and comparatively simple of construction, hence of low cost to manufacture.

Other objects will appear hereinafter.

With these objects in view our invention consists in a journal bearing characterized as above mentioned and in certain details of construction and arrangement of parts all as will be hereinafter fully described and more particularly pointed out in the claim.

Our invention will be more readily understood by reference to the accompanying drawings forming a part of this specification, and in which, Figure 1 is an end elevation of the preferred form of embodiment of our invention, Fig. 2 is a central vertical transverse section thereof the base being shown in elevation, and Fig. 3 is a vertical longitudinal section taken on substantially the line *x x* of Fig. 1.

Referring now to the drawings 1 indicates a shaft upon which is fixed a journal sleeve 2 of any suitable length and exterior diameter. Formed at either end portion of the sleeve 2 close to either of the extremities of the latter is a circumferential flange or collar 3. Inclosing said sleeve is the substantially cylindrically formed journal bearing or boxing proper comprised of a lower stationary shell 4 and an upper detachable shell 5, the same being secured together preferably by means of cap screws 6 passing through flanges 7 formed at the lateral adjoining edges of said members. Formed in said members 4 and 5 at the adjoining edges thereof are diaphragms 4′ and 5′ respectively, the same being longitudinally ground to receive the sleeve 2. The end walls of the members 4 and 5 are internally grooved to receive the flanges 3 of the sleeve 2, as shown in Fig. 3, such flanges obviously serving as a means of preventing lateral movement of said sleeve and hence the shaft 1 in the bearing. Radially projecting from the sleeve 2, the shank 8 thereof extending diametrically through said sleeve and shaft, a nut 9 threaded upon the extremity of said shank locking the same in position upon said sleeve and shaft, is a splasher blade 10. The base 11 of the shank 8 is preferably formed square in cross section and the sleeve 2 provided with a correspondingly formed slot to receive said base portion said blade being by such provision locked against rotary movement relative to said sleeve and shaft. Said blade is of a length such that the outer extremity thereof travels, when the blade is in motion, in close proximity to the cylindrical interior surface of the journal boxing. To permit of the rotation of said blade, as stated, the diaphragms 4′ and 5′ are transversely slotted to an extent slightly greater than the width of said blade.

Lubricating oil is supplied to the bearing through the opening 12 in the upper shell 5, around which is provided any ordinary or preferred form of oil cup 13. Such oil rests in the reservoir 14 formed in the lower portion of the shell 4. Upon the rotation of the shaft 1 the splasher blade 10 dips into the oil contained in said reservoir, carrying, upon each revolution thereof, a quantity of oil adhering to its surfaces. A portion of such oil is thrown or deposited, because of centrifugal force, into the dome shaped chamber 15 formed above the diaphragm 5′, whence the oil running down the walls of chamber 15, passes onto the diaphragm 5′. Said diaphragm is provided with an elongated central longitudinal slot 16, and the upper surface thereof is preferably formed concave in construction, the oil deposited in the chamber 15 being by such provision directed to and deposited upon substantially the entire extent of the journal or bearing surface of the sleeve 2. Flanges 3 prevent escape of the oil as well as longitudinal movement of the shaft. To facilitate the cleaning of or the draining of oil from the reservoir 14, we provide an ordinary cock 17 threaded into the lower portion of the member 4, the same communicating with the lowest point of the bottom of said reservoir.

In the drawings we have shown the journal sleeve 2 formed separately from the shaft 1, however, we may if desired form such construction directly upon and integrally with the latter. While we have shown what we deem to be the preferable form of our bearing we do not wish to be limited thereto, as there might be various changes made in the details of construction and arrangement of parts without departing from the spirit of our invention comprehended within the scope of the appended claim.

Having described our invention what we claim as new and desire to secure by Letters Patent is:

The combination of a shaft, of a bearing comprising a two part shell, the upper shell being dome shaped; horizontally disposed diaphragms formed at the adjoining edges of said shell parts, the upper surface of the upper diaphragm being concaved toward a central slot therein; a sleeve fixed to said shaft and provided with flanges running in grooves in said shell; and a splasher blade secured to said sleeve, substantially as described.

In testimony whereof we have signed our names to this specification in the presence of two subscribing witnesses.

JONATHAN L. BOYER.
MALAIN L. BOYER.
JACOB O. BOYER.

Witnesses:
JOSEPH F. OCHSUER,
JOHN J. POPEL.